(12) United States Patent
Ansari et al.

(10) Patent No.: US 9,909,862 B2
(45) Date of Patent: Mar. 6, 2018

(54) CURVED ARRAY OF LIGHT-EMITTING ELEMENTS FOR SWEEPING OUT AN ANGULAR RANGE

(71) Applicant: Google Inc., Mountain View, CA (US)

(72) Inventors: Sameer Ansari, San Francisco, CA (US); Roman Lewkow, San Jose, CA (US); Jason Holt, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/181,370

(22) Filed: Jun. 13, 2016

(65) Prior Publication Data

US 2017/0356740 A1 Dec. 14, 2017

(51) Int. Cl.
*G01B 11/26* (2006.01)
*F21V 5/04* (2006.01)
(Continued)

(52) U.S. Cl.
CPC .............. *G01B 11/26* (2013.01); *F21V 5/043* (2013.01); *F21Y 2103/30* (2016.08); *F21Y 2115/10* (2016.08); *F21Y 2115/15* (2016.08)

(58) Field of Classification Search
CPC .......... G01C 15/00; G01C 3/00; G01B 11/26; G06F 3/0325
See application file for complete search history.

(56) References Cited

U.S. PATENT DOCUMENTS 3,940,609 A * 2/1976 Johnstun .................. G01D 5/30 250/231.13
4,474,422 A 10/1984 Kitamura
(Continued)

FOREIGN PATENT DOCUMENTS

EP 0887192 A1 12/1998

OTHER PUBLICATIONS

Raskar, et al.; Prakash: Lighting Aware Motion Capture using Photosensing Markers and Multiplexed Illuminators; ACM Transactions on Graphics, vol. 26, No. 3, Article 36, Publication date: Jul. 2007; ACM.
Ultra Slim Projection Optics for Structured Illumination; Fraunhofer Institute for Applied Optics and Precision Engineering IOF; http://www.iof.fraunhofer.de/content/dam/iof/en/documents/pb/ultra-slim-projection-optics-e.pdf; retrieved on Jun. 10, 2016.
(Continued)

*Primary Examiner* — Kara E Geisel
*Assistant Examiner* — Maurice Smith
(74) *Attorney, Agent, or Firm* — McDonnell Boehnen Hulbert & Berghoff LLP

(57) ABSTRACT

The present disclosure relates to curved arrays of individually addressable light-emitting elements for sweeping out angular ranges. One example device includes a curved optical element. The device may also include a curved array of individually addressable light-emitting elements arranged to emit light towards the curved optical element. A curvature of the curved array is substantially concentric to at least a portion of the circumference of the curved optical element. The curved optical element is arranged to focus light emitted from each individually addressable light-emitting element to produce a substantially linear illumination pattern at a different corresponding scan angle within an angular range. The device may further include a control system operable to sequentially activate the individually addressable light-emitting elements such that the substantially linear illumination pattern sweeps out the angular range.

20 Claims, 9 Drawing Sheets

(51) Int. Cl.
*F21Y 103/30* (2016.01)
*F21Y 115/15* (2016.01)
*F21Y 115/10* (2016.01)

(56) References Cited

U.S. PATENT DOCUMENTS

| | | | |
|---|---|---|---|
| 4,847,734 | A | 7/1989 | Katoh |
| 4,901,207 | A | 2/1990 | Sato et al. |
| 5,412,634 | A | 5/1995 | Büchler et al. |
| 5,838,024 | A | 11/1998 | Masuda et al. |
| 6,087,645 | A * | 7/2000 | Kitajima ................ G01B 11/26 250/203.1 |
| 6,455,931 | B1 | 9/2002 | Hamilton, Jr. et al. |
| 6,556,349 | B2 | 4/2003 | Cox et al. |
| 6,570,324 | B1 | 5/2003 | Tutt et al. |
| 6,627,865 | B1 | 9/2003 | Hamilton, Jr. et al. |
| 6,637,921 | B2 | 10/2003 | Coushaine |
| 6,712,471 | B1 | 3/2004 | Travis et al. |
| 6,778,257 | B2 | 8/2004 | Bleeker et al. |
| 7,731,395 | B2 | 6/2010 | Parkyn et al. |
| 9,250,040 | B1 * | 2/2016 | Bird .......................... F41G 5/06 |
| 2007/0081168 | A1 * | 4/2007 | Johnston ............. A61B 5/0084 356/614 |
| 2009/0122272 | A1 | 5/2009 | Silverstein et al. |
| 2014/0071427 | A1 | 3/2014 | Last |
| 2015/0055117 | A1 | 2/2015 | Pennecot et al. |
| 2016/0006914 | A1 | 1/2016 | Neumann |

OTHER PUBLICATIONS

U.S. Appl. No. 15/180,977, filed Jun. 13, 2016; Inventors: Sameer Ansari, Roman Lewkow, Jason Holt.

Mautz, et al.; Survey of Optical Indoor Positioning Systems; 2011 International Conference on Indoor Positioning and Indoor Navigation (IPIN); Sep. 21-23, 2011; IEEE.

Xiao, et al.; Lumitrack: Low Cost, High Precision, High Speed Tracking with Projected m-Sequences; Proceedings of the 26th annual ACM symposium on User interface software and technology; 2013; ACM.

Herrnsdorf, et al.; Concept of a GaN-LED-based positioning system using structured illumination; 2015 IEEE Photonics Conference, IPC 2015; Nov. 9, 2015; IEEE.

PCT International Search Report and Written Opinion, PCT International Application No. PCT/EP2017/015162, dated Apr. 5, 2017,18 pages.

PCT International Search Report and Written Opinion, PCT International Application No. PCT/EP2017/015157, dated Mar. 30, 2017,17 pages.

YouTube video titled "HTC Vive Lighthouse Chaperone tracking system Explained"; published Aug. 24, 2015; URL: https://www.youtube.com/watch?v=J54dotTt7k0; screenshots included.

HTC Vive Homepage; URL: http://www.htcvive.com/us/; archived on Jun. 2, 2016; retrieved from https://web.archive.org/web/20160602080204/http://www.htcvive.com/us/.

* cited by examiner

CURVED ARRAY OF LIGHT-EMITTING ELEMENTS FOR SWEEPING OUT AN ANGULAR RANGE

BACKGROUND

A variety of techniques exist to map the geometry of an environment and objects within the environment and/or to determine the location of objects of interest within the environment. These methods can include applying one or more patterns of illumination to the environment (e.g., an array of vertical and/or horizontal lines of illumination) and imaging the environment, using one or more cameras, when exposed to such illumination. Additionally or alternatively, a particular object within the environment could include a tag configured to detect the emitted illumination. The location of the tag could be determined based on the detected illumination. In a further example, a particular object within the environment could include a tag configured to emit illumination and/or to reflect illumination. The location of the tag could be determined by imaging the environment with one or more cameras.

SUMMARY

The specification and drawings disclose embodiments that relate to a curved array of light-emitting elements for sweeping out an angular range. An object within the angular range, equipped with a light detecting device, could identify its location relative to the array of light-emitting elements based on a time associated with a detected illumination.

In one aspect the disclosure describes a device. The device includes a curved optical element. The device also includes a curved array of individually addressable light-emitting elements arranged to emit light towards the curved optical element. The curvature of the curved array is substantially concentric to at least a portion of the circumference of the curved optical element. The curved optical element is arranged to focus light emitted from each individually addressable light-emitting element to produce substantially linear illumination pattern at a different corresponding scan angle within an angular range. The device further includes a control system operable to sequentially activate the individually addressable light-emitting elements such that the substantially linear illumination pattern sweeps out the angular range.

In another aspect the disclosure describes a method. The method includes emitting light from a first individually addressable light-emitting element toward a curved optical element. The method also includes focusing, by the curved optical element, the light emitted from the first individually addressable light-emitting element to produce a substantially linear illumination pattern at a first corresponding scan angle within an angular range. The method further includes emitting light from a second individually addressable light-emitting element toward the curved optical element. Additionally, the method includes focusing, by the curved optical element, the light emitted from the second individually addressable light-emitting element to reproduce the substantially linear illumination pattern at a second corresponding scan angle within the angular range. The first and second individually addressable light-emitting elements are in a curved array of individually addressable light-emitting elements. The first and second individually addressable light-emitting elements are sequentially activated by a control system such that the substantially linear illumination pattern sweeps out at least a portion of the angular range.

In a third aspect the disclosure describes a system. The system includes a light-emitting device. The light-emitting device includes a curved optical element. The light-emitting device also includes a curved array of individually addressable light-emitting elements arranged to emit light towards the curved optical element. A curvature of the curved array is substantially concentric to at least a portion of the circumference of the curved optical element. The curved optical element is arranged to focus light emitted from each individually addressable light-emitting element to produce a substantially linear illumination pattern at a different corresponding scan angle within an angular range. The light-emitting device further includes a control system operable to sequentially activate the individually addressable light-emitting elements such that the substantially linear illumination pattern sweeps out the angular range. In addition, the system includes a light detector. The light detector is configured to detect light emitter from the light-emitting device.

These as well as other aspects, advantages, and alternatives, will become apparent to those of ordinary skill in the art by reading the following detailed description, with reference where appropriate to the accompanying drawings.

DETAILED DESCRIPTION

Figure 1:
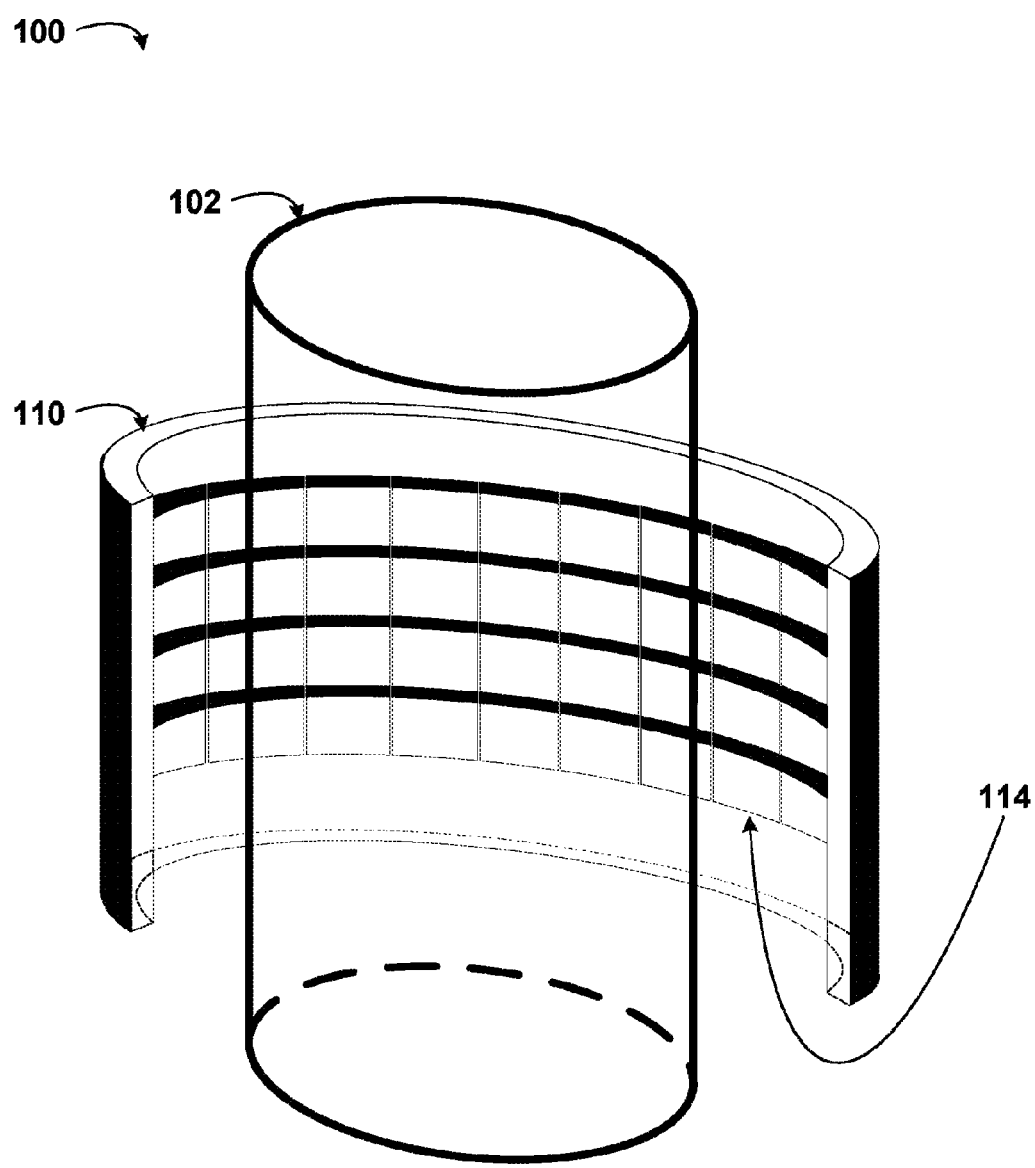
FIG. 1 is a perspective view of a curved array of individually addressable light-emitting elements and a curved optical element, according to example embodiments.

In the following detailed description, reference is made to the accompanying figures, which form a part hereof. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I. Overview

The location of objects in an environment can be determined by illuminating the environment with a plurality of different patterns of illumination over time. The patterns of illumination could be specified such that different regions within the environment are exposed to different time-varying waveforms of light intensity. Time-varying waveforms of light intensity are illumination patterns (e.g., a substantially linear illumination pattern) that are modulated in time (e.g., by a light emitter). The location of an object in the environment could then be determined by detecting a time-varying waveform of light intensity received at one or more locations on the object and associating such detected waveforms with respective regions within the environment. For example, a light sensor disposed on an object of interest could detect a time-varying waveform of light intensity incident on the object and the location of the object (e.g., a location or angle of the object relative to one or more light emitters that are emitting different patterns of illumination over time) could then be determined based on the detected time-varying waveform of light intensity.

Such a light emitter could emit different patterns of illumination that vary across a first range of angles in a first direction relative to the light emitter. The emitted patterns of illumination could serve to encode different regions of an environment with respect to the angle relative to the light emitter. For example, the light emitter could include an array of a plurality (e.g., thirty-two) of arranged, individually addressable light-emitting elements (e.g., light emitting diodes—LEDs or vertical-cavity surface-emitting lasers—VCSELs) and a curved optical element (e.g., a cylindrical lens). The curved optical element may focus light emitted by one of the individually addressable light-emitting elements to produce a substantially linear illumination pattern. Further, the substantially linear illumination pattern focused from each individually addressable light-emitting element could be projected at a different corresponding angle, or corresponding range of angles, within a first angular range. The individually addressable light-emitting elements may thus be sequentially activated (e.g., by a control system) to sweep out the first angular range. The number of individually addressable light-emitting elements within the array could contribute to the width and/or resolution of the first angular range, for example. A tag or other device in the environment could detect the light received at a particular point in the environment over time and a time-varying waveform of such detected illumination could be used to determine the angle of the tag relative to the light emitter. Such information could be used to determine the location, in one dimension or direction, of the tag relative to the light emitter and/or relative to the environment illuminated by the light emitter.

For example, the tag or other device that detects the light received from the light emitter could be configured to detect a synchronization pulse from the light emitter. The synchronization pulse may be provided by illuminating all of the individually addressable light-emitting elements simultaneously, thereby illuminating the entire area within the first angular range. The tag could then detect when the substantially linear illumination pattern that corresponds to the angular position of the tag illuminates the tag (e.g., as the light emitter sequentially illuminates the environment with substantially linear illumination patterns). The time interval between the synchronization pulse and the corresponding substantially linear illumination pattern could be used by the tag to determine the relative angular position of the tag. As an alternative, the individually addressable light-emitting elements could be activated sequentially to sweep out the angular range in a dual-scan fashion (e.g., the angular range is swept out from 0 to 90 degrees and from 90 to 0 degrees over the same time interval). Based on a modulation of the light emitted from the individually addressable light-emitting elements (e.g., the individually addressable light-emitting elements are activated at a rate of 400 kHz for the increasing illumination angles and are activated at a rate of 700 kHz for the decreasing illumination angles), and the relative time interval between the two corresponding substantially linear illumination patterns, as measured by the tag, the first angular position relative to the light emitter can be determined by the tag. Additionally, as the individually addressable light-emitting elements may produce Gaussian or Semi-Gaussian illumination profiles for the substantially linear illumination patterns, the width of such a profile, which could indicate the divergence of the illumination pattern, could be used by the tag to determine the distance of the tag from the light emitter.

The light emitter could further include an additional curved optical element and an additional corresponding array of individually addressable light-emitting elements. These additional elements could be disposed such that the substantially linear illumination pattern produced by the additional astigmatic optical element and the additional corresponding array of individually addressable light-emitting elements is substantially orthogonal to the first array of optical elements (e.g., such that the second array sweeps in a second direction that is rotated from the first direction by between 80 degrees and 100 degrees). These additional elements could thus sweep out a second angular range that is substantially orthogonal to the first angular range (e.g., the first angular range varies from left to right and the second angular range varies from top to bottom with respect to the environment). Similarly, a tag or other device in the environment could detect the light received from the additional array and astigmatic optical element of the light emitter at a particular point in the environment over time. The corresponding time-varying waveform of such detected illumination could be used to determine the angle, relative to the light emitter in the second direction, of the tag. Such information could be used to determine the angular position, in a second dimension or direction, of the tag relative to the light emitter and/or relative to the environment illuminated by the light emitter.

The curved optical element could include an aspheric cylindrical lens or other optical component(s). The curved optical element may be positioned relative to the array of individually addressable light-emitting elements such that the location of a particular individually addressable light-emitting element corresponds to a specific angle, or set of angles, within the angular range relative to the light emitter. Alternatively, one or more of the patterns of illumination emitted from the light emitter (e.g., substantially linear illumination patterns) may correspond to a plurality of individually addressable light-emitting elements within the array.

The light emitter may be more energy efficient than other light emitter designs by only generating light that is used to illuminate an environment of interest. For example, such a light emitter design does not generate and discard light for non-illuminated regions of the environment (e.g., by discarding light to a light dump using a micromirror device). Further, such a light emitter may be relatively small, as it does not require masks, light dumps, or other elements beyond the array and curved optical element. The individually addressable light-emitting elements within the array may be operated by applying current via interconnects (e.g., on a circuit board) to generate respective different patterns of illumination from such a light emitter.

Multiple such light emitters may be provided, e.g., to provide different patterns of illumination over time such that the angle and/or location of a tag or other light-sensitive device in an environment may be determined with respect to two or more angles and/or directions. For example, one light emitter could provide one type of illumination pattern from a particular location that encodes regions of an environment in one direction. Then, another light emitter could provide a different type of illumination pattern from the same location that encodes regions of the environment in another orthogonal direction. A light detector within the environment could detect time-varying waveforms of light received from the first and second light emitters and use such detected waveforms of light to determine the angle of the light detector relative to the light emitter.

Additionally or alternatively, multiple light emitters could be located at two or more different locations. The location of a light detector in an environment, relative to the two or more different locations, could be determined from time-varying waveforms of light emitted by the light emitters when detected by the light detector (e.g., using triangulation). A light detector receiving time-varying waveforms of illumination from two or more light emitters could include the light emitters emitting illumination during respective different, non-overlapping periods of time (e.g., using a method of time division multiplexing), the light emitters emitting light having different wavelengths (e.g., using a method of wavelength multiplexing), the light emitters emitting light at different carrier frequency rates, or the light emitters emitting light that is distinguishable, by a light detector, by some other method.

The array of individually addressable light-emitting elements could be curved. Further, the curved array could be disposed concentrically about a portion of the curved optical element. In this way, the distance between each of the individually addressable light-emitting elements and the curved optical element could remain constant. When compared with alternative light emitter designs, the design that incorporates a curved, concentric array of individually addressable light-emitting elements may remove focusing errors (e.g., vignetting) and allow the effective length of the array, and correspondingly the field of view, to be increased. The curved array of individually addressable light-emitting elements could be assembled on the surface a flexible printed circuit board (PCB) sheet, for example. Alternatively, multiple linear arrays of individually addressable light-emitting elements could be placed around the curved optical element and linked via direct soldering or indirect wiring to form a two-dimensionally curved array.

It should be understood that the above embodiments, and other embodiments described herein, are provided for explanatory purposes, and are not intended to be limiting.

II. Example Light Emitters and Light Emitting Systems

It can be beneficial in a variety of applications to detect and/or determine the location of an object in an environment. These applications can include tracking the location of a drone, a ball used in a game, a conductor's baton, a controller, a body part of a person (e.g., for motion capture or gesture recognition), or some object(s). In an example application, the location of a plurality of markers or tags disposed on respective different locations on a person's body could be determined and used to detect the location and/or motions of the person and/or of particular parts of the person's body. In another example application, the location of a control wand or other device, relative to a head-mounted device or other device worn by a person, could be detected and used as an input to the head-mounted device or other system. In yet another example application, the location of a drone, robot, or other mobile system within an environment of interest (e.g., a room of a house, a warehouse, or a factory) could be determined and used to control the motion of the drone, robot, or other mobile system within the environment.

Determining the location of an object in an environment can include determining an absolute location of the object (e.g., relative to a defined coordinate system within the environment) and/or determining the location of the object relative to one or more other objects (e.g., relative to another object whose absolute or relative location is being determined, relative to a camera used to generate data used to determine the location of the object, relative to a light emitter used to illuminate the object). Determining the location of an object could include determining a location (e.g., a displacement) of the object and/or determining an angle of the object relative to a defined coordinate system within the environment. The angle of the object could also be determined relative to the location and/or orientation of some other object or device in the environment (e.g., relative to a camera, relative to a light emitter, relative to a person and/or a person's gaze direction).

The location of an object within an environment could be determined via a variety of methods. In some examples, the location of the object could be determined by illuminating the object (e.g., with illumination having a pattern of light that is specified over time and/or space) and/or receiving light from the object (e.g., imaging the environment that includes the object using a camera). The object could include a tag that is configured to emit light (e.g., a tag that is configured to emit a time-coded pattern of light to identify the tag) and/or to reflect light from a light emitter to a light detector (e.g., a tag that includes retroreflective material) to facilitate optical determination of the location of the object. Additionally or alternatively, the object could include a tag that is configured to detect light received by the object. A pattern over time of the intensity of such detected light, or some other property of the detected light, could be used to determine the location of the object.

Such an arrangement may include one or more light emitters illuminating the environment with patterns of illumination that are specified over time and/or space such that different regions of the environment are illuminated by different patterns of illumination over time. Thus, the pattern of illumination detected over time by a light detector on an object could be used to determine the region of the environment within which the object is located. Producing such patterns of illumination could include scanning one or more shaped beams of light across the environment, providing a plurality of different patterns of light to the environment over time, or providing illumination to an environment in some other way. The provided illumination could vary according to an angle relative to a light emitter (e.g., an angle in one or more directions relative to the light emitter) such that a detected intensity of the illumination over time could be used to determine the angle of a light detector (in one or more directions) relative to the light emitter.

In a particular example, a light emitter could be configured to provide a plurality of substantially linear illumination patterns during respective different periods of time. Each of the substantially linear illumination patterns could provide light to the environment at a corresponding angle, or corresponding set of angles, across a first range of angles in a first direction. Thus, as the different substantially linear illumination patterns are produced by the light emitter over time, different regions of the environment can receive respective different time-varying patterns of intensity of the emitted illumination. As each of the substantially linear illumination patterns varies with respect to angle in the first direction within the first range of angles, the time-varying patterns of illumination intensity received by a particular region of the environment, which is located within the first ranges of angles in the first direction relative to the light emitter, can be used to determine the angle of the particular region, in the first direction, relative to the light emitter.

FIG. 1 is a perspective view of a curved array of individually addressable light-emitting elements 114 and a curved optical element, according to example embodiments. The individually addressable light-emitting elements 114 may be arranged on a circuit board 110, for example. The curved optical element may be a cylindrical lens 102 that refracts light emitted by the individually addressable light-emitting elements 114, in certain embodiments. Together, the cylindrical lens 102 and the curved array of individually addressable light-emitting elements 114 on the circuit board 110 comprise a light emitter 100.

The light emitter 100 could be configured and/or operated in a variety of ways to produce, during respective periods of time, patterns of illumination as described herein. In a particular example, the individually addressable light-emitting elements 114 could be disposed on the circuit board 110 in a curved array formation (as depicted in FIG. 1). The circuit board 110 may then be disposed relative to the cylindrical lens 102 such that, when a particular individually addressable light-emitting element 114, or a set of individually addressable light-emitting elements 114, is operated to emit light, the light emitter produces a respective pattern of illumination as described herein (e.g., a substantially linear illumination pattern). The location, on the circuit board 110 relative to the cylindrical lens 102, of the individually addressable light-emitting elements 114 of a particular set of individually addressable light-emitting elements 114 could be specified to control the pattern of illumination emitted by the particular set of individually addressable light-emitting elements 114.

The duration of the periods of time during which the light emitter 100 produces each substantially linear illumination pattern, and the rate at which a sequence of such different substantially linear illumination patterns is repeated, could be specified to facilitate the determination of the angular position of a light detector or other object at more than a specified rate. For example, a sequence of substantially linear illumination patterns from the light emitter 100 could be repeated at a rate greater than 10 Hertz. Further, if six or more different substantially linear illumination patterns were produced during each repetition of such a sequence (e.g., to provide six different illuminated environmental locations for the determination of the angular position of the light detector or other object in the first direction relative to the light emitter) by six different individually addressable light-emitting elements, each pattern of illumination could be provided during respective time periods that are less than 16.7 milliseconds in duration.

The illustrated light emitter 100 for producing substantially linear illumination patterns can have a number of benefits relative to other apparatuses for generating such patterns of illumination. The energy efficiency of generating patterns of illumination using a light emitter as described herein can be greater than other methods of generating such patterns of illumination (e.g., by absorbing or otherwise blocking a portion of an emitting light using a mask, by reflecting, by a digital micromirror device, a specified portion of light produced by a light source to be absorbed by a light sink or other element). Further, by forming the individually addressable light-emitting elements 114 on the circuit board 110, an alignment between different sets of the individually addressable light-emitting elements 114 can be precisely controlled. This could allow for increased alignment between features (e.g., ranges of angles) of different produced patterns of illumination (e.g., substantially linear illumination patterns) that correspond to the respective different sets of individually addressable light-emitting elements 114. Still further, incorporating the individually addressable light-emitting elements into a single die that is adhered to or otherwise disposed relative to a curved optical element can provide a light-emitting device that has a small size relative, for example, to other light-emitting apparatuses that include multiple masks, light-emitting elements, or other optical elements, or other means for producing patterns of illumination as described herein. By connecting the individually addressable light-emitting elements 114, via electrical interconnects for example, into a number of sets of individually addressable light-emitting elements 114 that correspond to respective emitted patterns of illumination, the different patterns of illumination can be produced without the use of electronic switches (e.g., transistors) being present on the circuit board 110. Additionally, by disposing the individually addressable light-emitting elements 114 about the cylindrical lens 102 in a curved array, vignetting errors can be reduced or eliminated and the field of view can be increased as the individually addressable light-emitting elements 114 can concentrically surround as much as 180 degrees of the cylindrical lens 102, for example. Additional advantages of the apparatuses for generating patterns of illumination described herein will be apparent.

The illustrated locations and sizes of the individually addressable light-emitting elements 114 on the circuit board 110, the curvature and extent of the circuit board 110, and other details of the light emitter 100 illustrated in FIG. 1 are intended as non-limiting, illustrative embodiments of the methods and apparatus described herein. Different locations of individually addressable light-emitting elements on a circuit board, corresponding to different patterns of emitted illumination, are anticipated by the inventors. Further, different interconnections of sets of individually addressable light-emitting elements may be used. For example, first and second sets of individually addressable light-emitting elements could be connected, with opposite polarities, to first and second electrical pads of a circuit board. This may allow a selected one of the first and second sets of individually addressable light-emitting elements to be operated to emit light by controlling a polarity of voltage provided to the sets of individually addressable light-emitting elements via the first and second electrical pads. The number of electrical pads on the circuit board used to provide current and/or voltage to sets of individually addressable light-emitting elements of the circuit board could be reduced by using an electrical pad in common between a number of sets of individually addressable light-emitting elements and/or pairs of sets of individually addressable light-emitting elements. Other configurations of interconnections between individually addressable light-emitting elements and electrical pads of a circuit board may be used.

The circuit board 110 may comprise a die (e.g., a die composed of gallium arsenide, silicon, and/or other semiconductor materials), on which or in which other components of the light emitter 100 are formed. In some embodiments, the circuit board 110 is a printed circuit board (PCB). Such a circuit board may have a FR-4 glass epoxy substrate with copper conductive layers, in some embodiments. The copper conductive layers could be etched or deposited, in various embodiments, to define electrical interconnects, for example. Furthermore, the electrical interconnects may be connected to electrical pads on the circuit board such that each of the sets of individually addressable light-emitting elements can be operated by providing current and/or voltage to corresponding electrical pads on the circuit board.

In alternate embodiments, the circuit board 110 may be replaced with a flexible material. For example, organic LEDs may be formed in an organic semiconductor substrate to define the individually addressable light-emitting elements 114. Still further, in some alternate embodiments, the individually addressable light-emitting elements 114 may be attached (e.g., physically and/or electrically) to one another to define an array. This may obviate the need to include a structure on which the individually addressable light-emitting elements are arranged (e.g., the circuit board 110).

The individually addressable light-emitting elements 114 could include LEDs, VCSELs, lasers, or other individually addressable light-emitting components formed on or of the circuit board 110. For example, if the circuit board 110 were a semiconductor material, the individually addressable light-emitting elements 114 could include light-emitting diode regions, light-emitting quantum wells, Bragg reflectors, or other elements formed from gallium arsenide, aluminum gallium arsenide, positive or negative doping materials, or other materials or structures. Forming the individually addressable light-emitting elements 114 could include photopatterning, photolithography, chemical vapor deposition, sputtering, oxidation, ion implantation, or other methods for forming elements of an integrated optoelectronic circuit.

The individually addressable light-emitting elements 114 may be packaged in such a way that a portion of the individually addressable light-emitting elements 114 does not emit light. This could be because the packaging occludes some of the light-emitting area. Alternatively, there may be electrical components integrated within each individually addressable light-emitting elements 114, which prevent the entire individually addressable light-emitting element 114 from being capable of emitting light. The effective portion of the individually addressable light-emitting element 114 may be referred to as the projecting surface, in some embodiments.

The curved optical element of a light emitter, as described herein, could be configured in a variety of ways, and include a variety of elements (e.g., lenses, mirrors, diffraction gratings, and/or prisms) such that light emitted from a set of individually addressable light-emitting elements of the light emitter is projected as a pattern of illumination that varies with angle across a first range of angles in a first direction (e.g., that provides illumination within one or more ranges of angles within the first range of angles). This could include focusing and/or deflecting light emitted by the individually addressable light-emitting elements, with respect to the first direction, such that the location of a particular individually addressable light-emitting element is related to a range of angles of the environment. This could further include defocusing and/or spreading light from the individually addressable light-emitting element with respect to a second direction. As such, the curved optical element could also be an astigmatic optical element.

The array of individually addressable light-emitting elements could be curved around a portion of the cylindrical lens (as illustrated in FIG. 1). Such a curved array could be concentric to the cylindrical lens. Alternatively, the curvature of the curved array could be greater than or less than the curvature of the perimeter of the cylindrical lens. In some embodiments, the curved array could be attached to or fabricated on a section of the cylindrical lens, itself. The curved array may contain multiple rows and/or columns of individually addressable light-emitting elements that are configured to cooperatively produce one or more substantially linear illumination patterns by projecting light through the cylindrical lens. In some embodiments, the individually addressable light-emitting elements, themselves, could be flexible. In other embodiments, the individually addressable light-emitting elements could be rigid, but mounted on a flexible surface (e.g., a flexible PCB), allowing the array to be curved about the cylindrical lens.

Further, the individually addressable light-emitting elements of an interconnected set of one or more individually addressable light-emitting elements could be arranged in some other manner across the surface of a circuit board of a light emitter. For example, the individually addressable light-emitting elements could be distributed across the circuit board in order to increase an amount of light emitted from the light emitter and/or reduce a temperature of the array of individually addressable light-emitting elements when the array is operated to sequentially project substantially linear illumination patterns. Because the individually addressable light-emitting elements may be distributed across a wider area, there could be more surface area for heat dissipation, which could thereby reduce the overall temperature of the array of individually addressable light-emitting elements.

The distribution of individually addressable light-emitting elements across a circuit board in a light emitter could be provided in order to reduce an average and/or peak temperature of the light emitter when the individually addressable light-emitting elements are being operated to emit light. This could be done by spreading the production of such waste heat over a wider area of the circuit board or according to some other consideration (e.g., to simplify routing of electrical interconnects and/or electrical pads on the circuit board, to provide a configuration of individually addressable light-emitting elements, electrical interconnects, or other features that is compatible with circuit board fabrication process, or to increase the amount of light output from the light emitter).

As shown in FIGS. 1-4, the curved optical element could be a single refractive aspheric cylindrical lens 102. However, a curved optical element of a light emitter, as described herein, could include additional or alternative elements configured to focus, deflect, or otherwise modify light emitted from the individually addressable light-emitting elements of the light emitter. In an example embodiment, the astigmatic optical element focuses light produced by sets of one or more of the individually addressable light-emitting elements to produce illumination patterns such as those described herein.

To do so, such a curved optical element could include a diffraction grating, a hologram, or some other reflective, refractive, and/or absorptive elements. The curved optical element could include a reflective element having an aspheric optical surface. The curved optical element could include a single lens, mirror, grating, or other optical element. Alternatively, the curved optical element could include multiple optical components (e.g., multiple lenses, multiple gratings, and/or multiple mirrors).

In some examples, the curved optical element could include a single refractive or reflective lens having a first surface having a geometry specified to focus and/or deflect the emitted light in a first direction (e.g., a cylindrical geometry, such as an aspheric cylindrical geometry). Such a refractive or reflective lens could include a second surface having a geometry specified to defocus and/or spread the emitted light in a second direction that is substantially orthogonal to the first direction (e.g., a concave geometry) such that each individually addressable light-emitting element, when operated to emit light, provides light across a similar range of angles in the second direction. Such a curved optical element could therefore focus the light emitted from each individually addressable light-emitting element into a substantially linear illumination pattern, for example.

Components or features of the curved optical element could be formed on a circuit board, for example, using optically transparent materials, or other elements on the surface of the circuit board (e.g., using methods used for integrated circuit fabrication). Additionally or alternatively, the curved optical element could be bonded to the circuit board using an adhesive, clips, an armature, or some other means. This could include bonding the curved optical element (e.g., using an adhesive) to the circuit board directly, to a package that encloses the circuit board (e.g., a ceramic, metal, or polymer integrated circuit package that includes a window), or to some other component of a light emitter. A light emitter could include further optical elements in addition to the curved optical element; for example, a plurality of microlenses could be provided on the surface of the circuit board to focus, collimate, or otherwise modify the emission pattern of light emitted from each of the individually addressable light-emitting elements.

As noted above, a light emitter (e.g., 100) could be operated to provide a number of different patterns of illumination, during respective different periods of time, to an environment. The patterns of illumination could be specified such that an intensity of illumination received over time by an object in the environment (e.g., by a light detector of such an object), from the light emitter, could be used to determine the location of the object within the environment (e.g., to determine the angle of the object relative to the light emitter). This could involve determining a pattern of light incident on the object during different periods of time corresponding to different illumination patterns. The location of the object (e.g., the angle of the object relative to the light emitter) could then be determined by determining a region (e.g., a range of angles) within the environment that corresponds, based on the different patterns of illumination, to the pattern of received light.

Other configurations of a light emitter are anticipated by the inventors. A circuit board could include a number of sets of interconnected individually addressable light-emitting elements (e.g., at least one hundred sets) such that the sets of individually addressable light-emitting elements could be operated to produce respective different patterns of illumination to facilitate determination of the location of an object in an environment that receives the patterns of illumination. Such sets of one or more individually addressable light-emitting elements could be interconnected with each other and/or with electrical pads of a circuit board in a variety of ways. For example, each set of individually addressable light-emitting elements could be connected to a respective pair of electrical pads of the circuit board, or a number of sets could be connected in common to a single electrical pad (e.g., according to a common-cathode arrangement or a common-anode arrangement). Additionally or alternatively, pairs of sets of one or more individually addressable light-emitting elements could share one or more electrical pads, being connected to such shared terminals according to an opposite polarity (that is, the anodes of the individually addressable light-emitting elements of a first set could be connected to an in-common terminal while the cathodes of the individually addressable light-emitting elements of a second set could be connected to the in-common terminal) such that each set of such a pair could be operated, during a respective period of time, to provide a respective pattern of illumination by providing voltage of a corresponding polarity to the in-common terminal(s). Other configurations of electrical pads on a light emitter, as described herein, are anticipated by the inventors.

Figure 2:
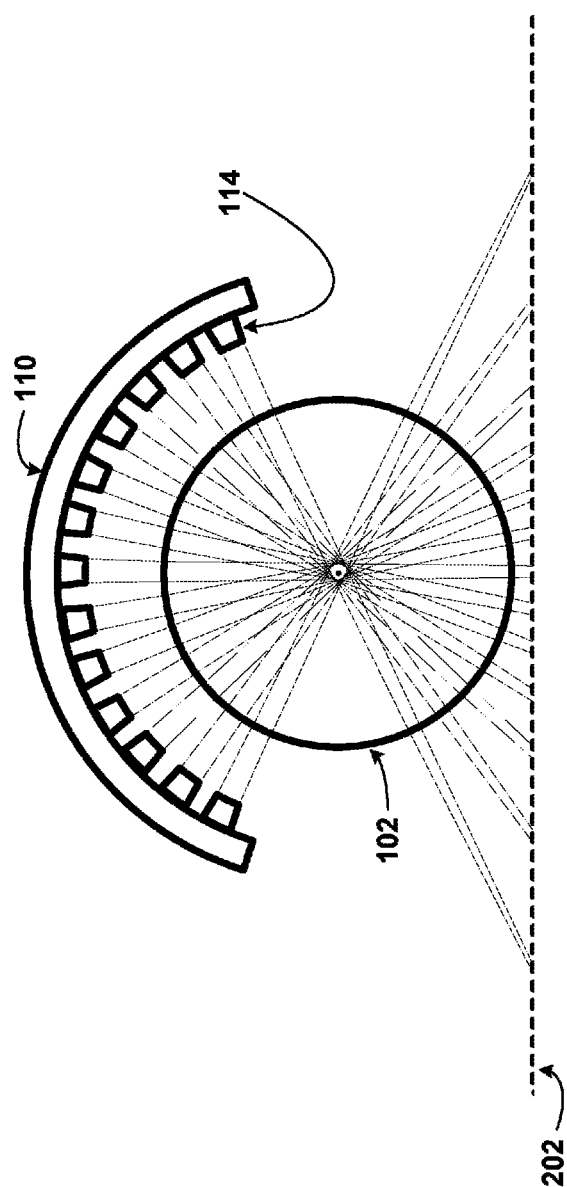
FIG. 2 is a top view of a curved array of individually addressable light-emitting elements and a curved optical element, according to example embodiments.

FIG. 2 illustrates, in cross-section, the effect of a curved optical element (e.g., the cylindrical lens 102 illustrated in FIG. 1) of a light emitter 100 on light emitted from individually addressable light-emitting elements 114 on a circuit board 110 of the light emitter 100. Note that the dimensions, angles of emitted illumination, operation of the cylindrical lens 102 to refract light, and other aspects of FIG. 2 are intended to conceptually illustrate the production of patterns of illumination (e.g., substantially linear illumination patterns) by a light emitter as described herein and are not intended to literally represent optical or other properties (e.g., angles or locations of rays of light, emission patterns of LEDs, apparent refractive indices of optical elements, focal lengths of refractive elements, an overall divergent or convergent character of a refractive element and/or of a light field produced by such an element, angles of refraction of rays of light by refractive elements) of a particular embodiment of such a light emitter.

FIG. 2 shows a top view of a cross-section through the circuit board 110 and the cylindrical lens 102 of the light emitter 100. A first set of one or more individually addressable light-emitting elements 114 of the circuit board 110 are projecting light toward the cylindrical lens 102, as shown. The cylindrical lens 102 is configured to focus, refract, deflect, or otherwise modify light emitted from individually addressable light-emitting elements 114 such that a substantially linear illumination pattern is produced (e.g., at a measurement plane 202 where a light detector may be located) by the operation of such individually addressable light-emitting elements 114. The substantially linear illumination pattern may vary across an angular range according to the location on the circuit board 110, an emission profile, or other properties of the individually addressable light-emitting elements 114 on the circuit board 110 and/or the location and orientation of the individually addressable light-emitting elements 114 relative to the cylindrical lens 102. Properties of the cylindrical lens 102, the emitter 100 (e.g., an emission profile of the individually addressable light-emitting elements 114), or other elements of the light emitter 100 could be specified such that the width of the substantially linear illumination patterns intersecting the measurement plane 202 are wider or narrow, for example.

As illustrated in FIG. 2, each of the individually addressable light-emitting elements 114 may project a pattern through the cylindrical lens 102. The patterns may be substantially linear when projected onto the vertical/horizontal plane at the measurement surface 202 (i.e., the illumination patterns may be elongated in the vertical dimension and focused in the horizontal dimension). The individually addressable light-emitting elements 114 may be arranged with respect to one another to such that the angular range can be spanned. The angular range may span 30 degrees, 45 degrees, 60 degrees, 75 degrees, or 90 degrees, when defined with respect to the light emitter 100, for example.

As illustrated in FIG. 1, the array of individually addressable light-emitting elements and/or the circuit board 110 on which they are mounted may be curved. The curved array can be disposed, at least partially, concentrically about the cylindrical lens 102, as in FIG. 2. Such a curvature can increase the span of the angular range (i.e., field of view) that can be illuminated by the light emitter at the measurement surface 202 when compared with a planar array of individually addressable light-emitting elements. Additionally, the curved nature of the array can further separate the light rays emitted by adjacent individually addressable light-emitting elements than the light rays would be separated with a planar array. This additional separation can lead to an increased spatial resolution at the measurement surface 202, for example. In various embodiments, the angular span of the curved array about the cylindrical lens could be more or less than is illustrated in the embodiment of FIG. 2. For example, the curved array could surround 90 degrees, 135 degrees, or 180 degrees of the cylindrical lens.

Figure 3:
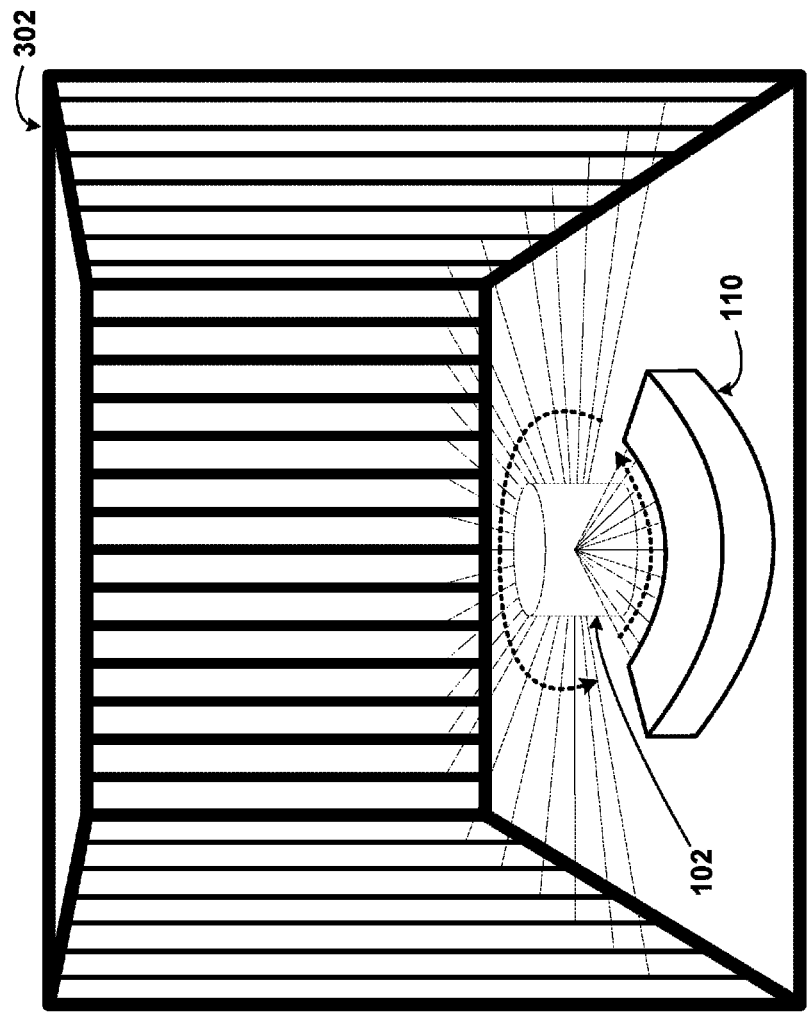
FIG. 3 is a perspective view of a curved array of individually addressable light-emitting elements projecting into an environment, according to example embodiments.

FIG. 3 is a perspective illustration of a light emitter (e.g., the light emitter 100 illustrated in FIG. 1) sequentially projecting illumination patterns into an environment 302 (e.g., a room). The light emitter may include a cylindrical lens 102 and a circuit board 110, with individually addressable light-emitting elements 114 thereon (occluded from view), for example. The cylindrical lens 102 may focus the light emitted by the individually addressable light-emitting elements 114 to produce substantially linear illumination patterns at corresponding angles with respect to the light emitter 100. As the individually addressable light-emitting elements 114 are sequentially activated, the substantially linear illumination may progress through an angular range with respect to the light emitter 100 (as indicated in FIG. 1 by the dashed arrows). In various embodiments, the angular range may vary in the horizontal/depth plane or in the vertical/depth plane (e.g., if the light emitter 100 were rotated 90 degrees in the horizontal/vertical plane.). The angular range may span 15 degrees, 30 degrees, 45 degrees, 60 degrees, 75 degrees, 90 degrees, 105 degrees, 120 degrees, 135 degrees, 150 degrees, 165 degrees, or 180 degrees in various embodiments. Other angular range spans are possible.

The spacing between, width, and location of the substantially linear illumination patterns illustrated in FIG. 3 are provided as an example, and are not meant to indicate a preferred embodiment. It will be readily understood that multiple projection patterns are possible when sequentially illuminating the individually addressable light-emitting elements 114. In some embodiments, for example, the interstitial space between adjacent substantially linear illumination patterns may be smaller than illustrated. In one such embodiment, the substantially linear illumination patterns may be projected conterminously to one another (e.g., the left edge of one of the substantially linear illumination patterns may lie immediately adjacent to the right edge of an adjacent substantially linear illumination pattern). This may allow, if all of the individually addressable light-emitting elements were activated simultaneously for example, a synchronization pulse to vertically illuminate the entire portion of the environment 302 that lies within the angular range.

Determination of the location of an object (e.g., determination of the angle of a light detector in the first direction relative to the light emitter 100) based on time-varying patterns of illumination received from the light emitter 100 can include determining the timing of detection of the illumination (e.g., the timing of detection of a given light intensity from a plurality of measurements of the intensity of light received by a light detector) relative to the timing of time periods during which each of a number of different patterns of illumination are produced by the light emitter 100. In some examples, such timing information could be determined by the light emitter 100 and a light detector 420 both including highly accurate, synchronized clocks. In other examples, the light emitter 100 could include a radio frequency transmitter (or other means for wireless information transmission) that is operated to emit such timing information. In still further examples, such timing information could be recovered from the time-varying pattern of illumination received by a light detector from the light emitter 100. In some embodiments, the timing information could be recovered by recovering pulse timing information from changes (e.g., rising or falling edges) in a detected time-varying illumination signal.

Figure 4:
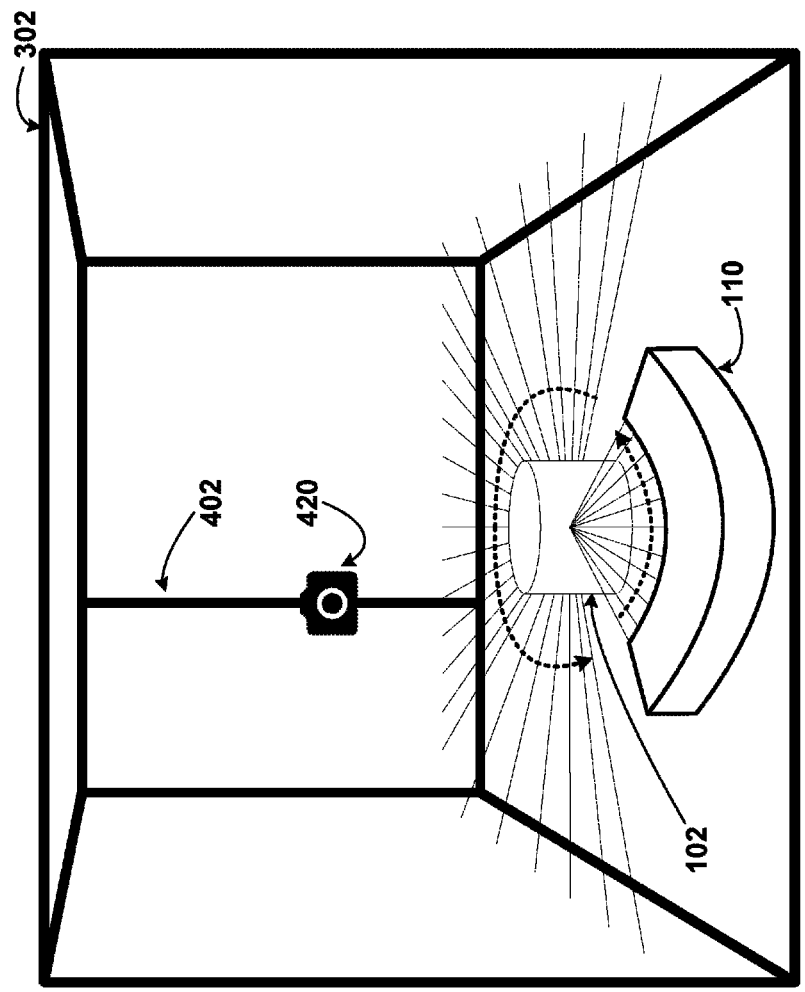
FIG. 4 is a perspective view of a curved array of individually addressable light-emitting elements projecting at a light detector, according to example embodiments.

As illustrated in FIG. 4, the light emitter 100 may emit light into an environment 302 (e.g., a room) in the form of substantially linear illumination patterns (as illustrated in FIG. 3). This could be accomplished by the light emitter 100 using a curved optical element (e.g., a cylindrical lens 102) and a series of individually addressable light emitting elements 114 (occluded from view in FIG. 4) arranged into an array on a circuit board 110, for example. As the individually addressable light emitting elements 114 are sequentially activated (e.g., by a control system also on the circuit board 110 connected to the individually addressable light-emitting elements 114 using electrical interconnects), substantially linear illumination patterns may illuminate different angles within an angular range defined by the light emitter 100 in the environment 302. The sequential scanning is illustrated in FIG. 4 by the dashed arrows. Further, the locations where substantially linear illumination patterns could be projected are illustrated by the solid lines emanating from the cylindrical lens 102. The substantially linear illumination pattern that is projected to the angular position of the light detector 420 is indicated in FIG. 4 by reference numeral 402.

As described above, determining the location of an object (e.g., the light detector 402) based on a detected time-varying intensity of light received from a light emitter can include making such determinations based on information about the timing of patterns of illumination emitted from the light emitter. Such timing information could be based on an internal clock of a controller of the light detector, or based on timing information received using a receiver (e.g., timing information transmitted via radio frequency signals from the light emitter). Additionally or alternatively, the timing information could be present in the timing of emission of patterns of illumination by the light emitter. For example, the light emitter could provide illumination to all of the angular range of illumination during one or more particular periods of time to provide synchronization timing or other data to an object. In some examples, providing one or more of the patterns of illumination could include modulating one or more of the provided patterns of illumination (e.g., by varying an intensity of the provided illumination across a range of intensities and/or between a number of different discrete levels of illumination) at a specified frequency or according to some other pattern over time to provide timing information (e.g., to identify one or more of the patterns of illumination as a 'first' pattern in a sequence of patterns of illumination) or to provide some other information.

Note that the detected substantially linear illumination pattern 402, as illustrated, is intended as a non-limiting example of a pattern that could be provided by the light emitter 100 as described herein. As an alternate example, a set of patterns of illumination provided by light emitter could vary across a first range of angles; a further pattern of illumination could provide illumination to all of the first range of angles. Such a pattern could be provided, as described above, to provide timing or other information to objects in the environment. Additionally or alternatively, such a pattern of illumination could be used to determine whether a given object is within the first range of angles and thus whether the light emitted from the light emitter can be used to determine the location of the given object.

A number of different patterns of illumination (and corresponding number of sets of one or more individually addressable light-emitting elements of a light emitter) could be specified to provide determination of the angular position of an object in an environment of interest to at least a specified resolution or accuracy. For example, ten or more different substantially linear illumination patterns could be provided by a light emitter (e.g., from ten or more corresponding sets of one or more light emitting elements of the light emitter) during respective different periods of time (e.g., during a plurality of repeated respective periods of time, according to a repeating sequence in time of producing the different substantially linear illumination patterns). Each of the provided substantially linear illumination patterns, when detected by a light detector of an object in the environment during a respective period of time, could provide a corresponding angular range in which the object is located relative to the light emitter. The angular range in which the object is located may occupy a span of angles based on the width of the corresponding substantially linear illumination pattern. As noted above, the number of provided different patterns of illumination could be specified to facilitate determination of the angular position of such an object to a specified degree of resolution. For example, providing ten or more different substantially linear illumination patterns could facilitate the determination of the angular position of an object to a resolution of 9 degrees if the complete angular range swept out by the light emitter were 90 degrees. An angular resolution of 9 degrees may correspond to a linear distance resolution of 15.6 centimeters when such an object is within 1 meter of a light emitter that is providing the substantially linear illumination patterns. Additionally, if the intensity profile of the substantially linear illumination patterns vary with respect to angle (e.g., due to the Gaussian nature of an individually addressable light-emitting element, such as a laser), and a light detector on the object can detect the variations in intensity, the angular resolution could be enhanced further.

Figure 5:
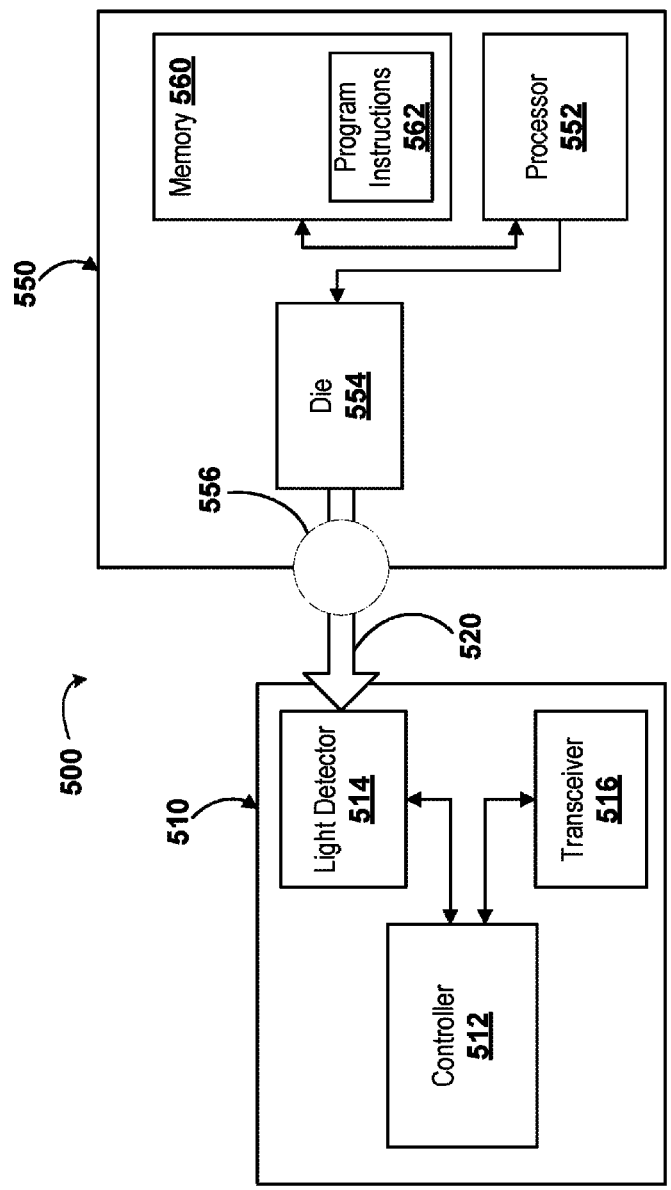
FIG. 5 is a block diagram of an example system that includes a light emitter and an object.

FIG. 5 is a block diagram of a system that includes a light emitter 550 that is configured to provide a plurality of different patterns of illumination as described elsewhere herein to an environment within which an object 510 is located. The object 510 includes a light detector 514 and a controller 512 configured to detect illumination 520 emitted from the light emitter 550. The object 510 further includes a transceiver 516 configured to transmit and/or receive information to and/or from some other device (e.g., from the light emitter 550). The light detector 514 is configured to detect a property (e.g., an intensity) of light 520 received from the light emitter 550 (e.g., light emitted as one or more substantially linear illumination patterns from the light emitter 550 during respective different periods of time). Such light can be detected and used to determine a location (e.g., an angle in a first direction relative to the light emitter 550) of the object 510. The light emitter 550 includes a die 554, which could be disposed on a circuit board for example, that includes one or more individually addressable light-emitting elements configured to provide light, via a curved optical element 556 (e.g., a cylindrical lens), to reproduce respective patterns of illumination to an environment that contains the object 510 (e.g., substantially linear illumination patterns). The light emitter 550 further includes a processor 552 and a memory 560 configured to facilitate operation of the die 554 to produce such patterns of illumination.

The light emitter 550 is configured to produce, during respective periods of time, different patterns of illumination. Emitting each different pattern of illumination includes emitting illumination within one or more ranges of angles of a first range of angles in a first direction relative to the device. Thus, each pattern of illumination varies across the first direction such that an object (e.g., 510) can detect the intensity of light received from the light emitter 550 during such different periods of time and use the detected light intensities to determine the location of the object 510 in an environment (e.g., to determine the angle of the object 510 relative to the light emitter 550 in the first direction). The light emitter 550 producing a particular pattern of illumination includes generating light from a set of one or more interconnected individually addressable light-emitting elements (e.g., LEDs, lasers, VCSELs) of the die 554.

The processor 552 of the light emitter 550 is configured to operate the die 554 (e.g., to apply voltages and/or currents to the different sets of one or more individually addressable light-emitting elements of the die 554) to produce different patterns of illumination from the light emitter 550. The processor 552 could include one or more microcontrollers, application-specific integrated circuits (ASICs), field-programmable gate arrays (FPGAs), or other electronic components configured to operate the die 554 to produce different patterns of illumination during different periods of time. The processor 552 could include elements configured to performs such actions using program instructions 562 or other information contained within the memory 560 (e.g., to generate a sequence of patterns of illumination according to a stored pseudo-random sequence or according to some other sequence, or to indicate some timing information or other information by emitting illumination 520 using the die 554). Alternatively, the light emitter 550 could include, instead of the processor 552 and memory 560, a number of flip-flops, timers, multiplexers, counters, or other circuits configured to operate the die 554 to produce patterns of illumination according to a sequence that is statically set by the structure of such circuits (e.g., to provide each of a set of patterns of illumination for a specified period of time in a repeating sequence).

The memory 560 can include program instructions 562 for execution by the processor 552 to cause the light emitter 550 to produce different patterns of illumination during respective different periods of time by emitting light from respective different sets of one or more individually addressable light-emitting elements on the die 554 or to perform some other operations. The memory 560 may include nonvolatile and/or volatile memory, in various embodiments. In some examples, the program instructions 562 could include instructions to provide the different patterns of illumination according to a set sequence (e.g., such that each of the different patterns of illumination are presented repeatedly in turn). Alternatively, the program instructions 562 could include instructions to provide the different patterns of illumination according to a random or pseudorandom sequence. In yet another example, the program instructions 562 could include instructions to provide a subset of the different patterns of illumination. For example, if the location of an object is known to a low resolution (e.g., it is known that the object is located within a second half of a range of angles of interest based on detecting light previously emitted from the light emitter 550), only a subset of different patterns of illumination could be provided to facilitate determination of the location of the object to a greater resolution and/or at a higher rate over time.

In a still further example, program instructions 562 could include instructions to provide illumination across a range of angles of interest to signal some information to objects in an environment. Signaling information to objects could include indicating timing information about previous or subsequent patterns of illumination emitted from the light emitter 560 or providing information about the identity or other information about patterns of illumination emitted from the light emitter 550 and/or information about the order of production of such patterns (e.g., a seed value or other information about a pseudorandom sequence of patterns of illumination).

In some examples, the light emitter 550 could include a transceiver, a communications interface, a user interface, one or more further dies, or some other components, and the program instructions 562 could include instructions to operate such further components to provide some functionality. For example, the light emitter 550 could include a transceiver configured to communicate with the object 510 (e.g., via the transceiver 516 of the object 510). The program instructions 562 could include instructions to operate the transceiver to transmit timing information, information about patterns of illumination and/or a sequence of production of such patterns by the light emitter 550, or some other information to the object 510. Additionally or alternatively, the program instructions 562 could include instructions to operate the transceiver to receive location information determined by the controller 512 of the object 510 based on light intensities detected using the light detector 514, to transmit information about such detected intensities such that the processor 552 can determine the location of the object 510 based on such detected intensities, or to receive some other information from the object 510. The program instructions 562 could include instructions to operate such a transceiver to communicate with some other systems (e.g., to transmit information about a determined location of the object 510 to a phone, a computer, or some other system).

The light emitter 550 can be part of a smart phone, digital assistant, head-mounted display, controller for a robot or other system, or some other portable computing device. In such examples, the light emitted from the light emitter 550 (e.g., as different patterns of illumination) could be used to determine the location of objects (e.g., of objects including light detectors) relative to such other objects (e.g., the location of a user's hand, on which is disposed a light detector, relative to a user's head, on which a head-mounted display including the light emitter 550 is disposed). Alternatively, the light emitter 550 can be part of a system that is mounted to a floor, wall, ceiling, or other object or building such that the location of the light emitter 550 is relatively static relative to an environment of interest. In such examples, the light emitted from the light emitter 550 could be used to determine the location of objects (e.g., of objects including light detectors) relative to the environment (e.g., the location of segments of a person's body, on which are disposed a number of respective light detectors, to facilitate detection of motions of the person's body within the environment). Other configurations and/or applications of a light emitter as described herein are anticipated by the inventors.

The object 510 could be part of or disposed on a system (e.g., a drone), a tag or other device attached to an object or person of interest (e.g., to a body segment of a person, to facilitate motion capture), or configured in some other way to facilitate determination of the location of the object 510 based on a time-varying intensity of light received from the light emitter 550. This includes detecting such an intensity of light using the light detector 514 of the object 510. The light detector 514 could include a photodiode, a phototransistor, or some other elements that are sensitive to light emitted from the light emitter 550 (e.g., to light at a wavelength corresponding to the wavelength of light emitted from individually addressable light-emitting elements of the die 554 of the light emitter 550).

The controller 512 could include a variety of elements configured to operate the light detector 514 to detect the intensity or other properties of light received from the light emitter 550 and/or to perform some other operations. For example, the controller 512 could include logic gates, arithmetic logic units, microprocessors, registers, digital oscillators, counters, logical buses, amplifiers, analog-to-digital converters (ADCs), mixers, analog oscillators, buffers, memories, program instructions, or some other component or components. The controller 512 could be configured to determine the location of the object 510 based on such detected illumination from the light emitter 550 and/or to transmit, using the transceiver 516, information about the detected illumination (e.g., about the intensity of the received illumination at a plurality of points in time, about the timing, sequence, or other information about a series of changes in the intensity of such received illumination over time) to some other system (e.g., the light emitter 550, a phone, a computer. The controller 512 could be configured to perform some other operations.

The controller 512 could include a variety of components used to detect illumination from the light emitter 550 that is received by the light detector 514. The light detector 514 could include a photodiode, a phototransistor, a photoresistive element, or some other components configured to output a voltage, a current, or some other electrical signal related to the intensity or other properties of the received light 520. The controller 512 could include amplifiers, transimpedance amplifiers, filters, buffers, voltage references, ADCs, or other components configured to operate the light detector 514 to detect the illumination 520 received from the light emitter 550. The controller 512 could include further circuitry (e.g., clock recovery circuitry to determine relative timing information from transitions in the intensity of the detected illumination, asynchronous serial receiver circuitry to detect a sequence of changes in the intensity of the received illumination that are relative to the location of the object 510).

The controller 512 could be configured to detect, using the light detector 514, illumination from multiple light emitters and/or from multiple different dies of a light emitter. In some examples, the controller 512 could include digital or analog filters configured to facilitate detecting illumination received from multiple different light emitters and/or from multiple different dies of a light emitter. This could be done by detecting components of the illumination received by the light detector 514 that vary at respective different frequencies corresponding to frequencies of modulation of the illumination emitted from such different dies and/or different light emitters. Additionally or alternatively, the light detector 514 could include multiple different light-sensitive elements (e.g., different photodiodes and/or optical filters coupled to such photodiodes) that are sensitive to illumination at respective different wavelengths corresponding to the wavelength of illumination produced by different light emitters and/or different dies of a light emitter. This could facilitate detection of illumination received from such multiple different light emitters and/or from multiple different dies of a light emitter.

It is noted that the block diagram shown in FIG. 6 is described in connection with functional modules for convenience in description. However, embodiments of the object 510 and/or the light emitter 550 can be arranged with one or more of the functional modules ("sub-systems") implemented in a single integrated circuit (e.g., an integrated circuit that includes a light detector and circuitry for detecting an intensity of light received via the light detector), multiple integrated circuits or electronic assemblies (e.g., printed circuits boards with electronic components disposed thereon), or according to some other consideration.

Note that the illustrated components of the object 510 and the light emitter 550 are intended as a non-limiting example embodiment. Also note that light emitters configured to provide patterns of illumination to an environment, objects located in such an environment, and/or light detectors located in such an environment as described herein may include more or fewer of the illustrated elements and/or may include further elements. For example, an object that is located in an environment and that includes a light detector configured to detect light emitted from a light emitter may lack a controller or other elements configured to operate the light detector and/or to determine the location of the object. In such examples, the light emitter could be tethered via a cable to some other system (e.g., to the light emitter 550) that is configured to detect the light received via the light detector and to determine the location of the light detector. Further examples of light emitters, light detectors, tags, and/or other objects or systems configured to produce and/or detect patterns of illumination as described herein are anticipated by the inventors.

As described elsewhere herein, a light emitter could include a die and a curved optical element configured to provide patterns of illumination from the light emitter that vary according to angle in a specified direction relative to the light emitter. This could be done by generating light from corresponding individually addressable light-emitting elements of the die. The location of such individually addressable light-emitting elements on the die could correspond to the angle or range of angles of illumination produced from the light emitter when the individually addressable light-emitting elements are operated to emit light. A light emitter configured in this way can provide such patterns more efficiently, in a smaller form factor, with minimal components and for minimal cost, or according to some other consideration in a manner that is improved relative to other apparatuses or methods for producing such patterns of illumination (e.g., using a digital micromirror device to control which portions of light produced by a light source will be provided to an environment). Such a die and/or curved optical element could be configured in a variety of ways to facilitate production of a variety of different patterns of illumination.

For example, while such a light emitter is described elsewhere herein as including a single die that is disposed relative to a curved optical element, multiple dies could be disposed relative to such a curved optical element. These multiple dies could provide respective patterns of illumination from respective sets of light-emitted elements of the different dies. Such different dies could be provided to increase a degree of power dissipation from the dies, to increase a total number of sets of individually addressable light-emitting elements on the dies and corresponding total number of different patterns of illumination that can be provided by the light emitter, or to provide some other functionality. This is illustrated by way of example in FIG. 7, which shows a first die 714 and a second die 724 that each include respective pluralities of light-emitting elements and are each set behind a first curved optical element 710 and a second curved optical element 720, respectively.

As described above, FIG. 6a is a top view of an array of individually addressable light-emitting elements 614 arranged on a circuit board 610 that project light toward a cylindrical lens 602. If sequentially activated, the array of individually addressable light-emitting elements 614 may repeatedly project the substantially linear illumination pattern across an angular range with respect to the light emitter (as illustrated by the arrow). The angular range swept out by the light emitter in FIG. 6a lies in the horizontal/depth plane (axes indicated in FIG. 6a). As indicated, the individually addressable light-emitting elements 614 are arrayed on the circuit board 610 along a curved axis lying within the horizontal/depth plane. Additionally, the primary axis of the cylindrical lens 602 lies substantially parallel to the vertical axis.

Figure 6A:
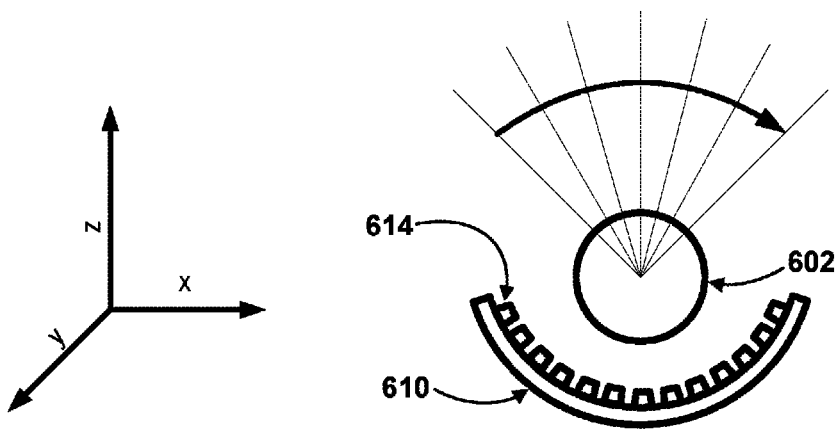
FIG. 6a is a top view of light from a curved array of individually addressable light-emitting elements being focused by a curved optical element, according to example embodiments.
Figure 6B:
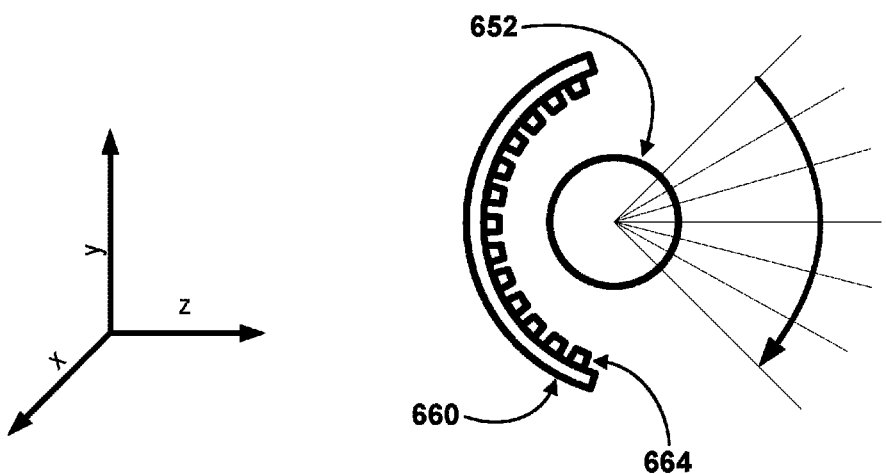
FIG. 6b is a side view of light from a curved array of individually addressable light-emitting elements being focused by a curved optical element, according to example embodiments.

Alternatively, the same light emitter could be used to project substantially linear illumination patterns that scan an angular range that lies in the vertical/depth plane (axes indicated in FIG. 6b). As illustrated in FIG. 6b, the light emitter is reoriented such that the individually addressable light-emitting elements 664 are arrayed on the circuit board 660 along a curved axis lying within the vertical/depth plane. Additionally, the primary axis of the cylindrical lens 652 lies substantially parallel to the horizontal axis.

Figure 7:
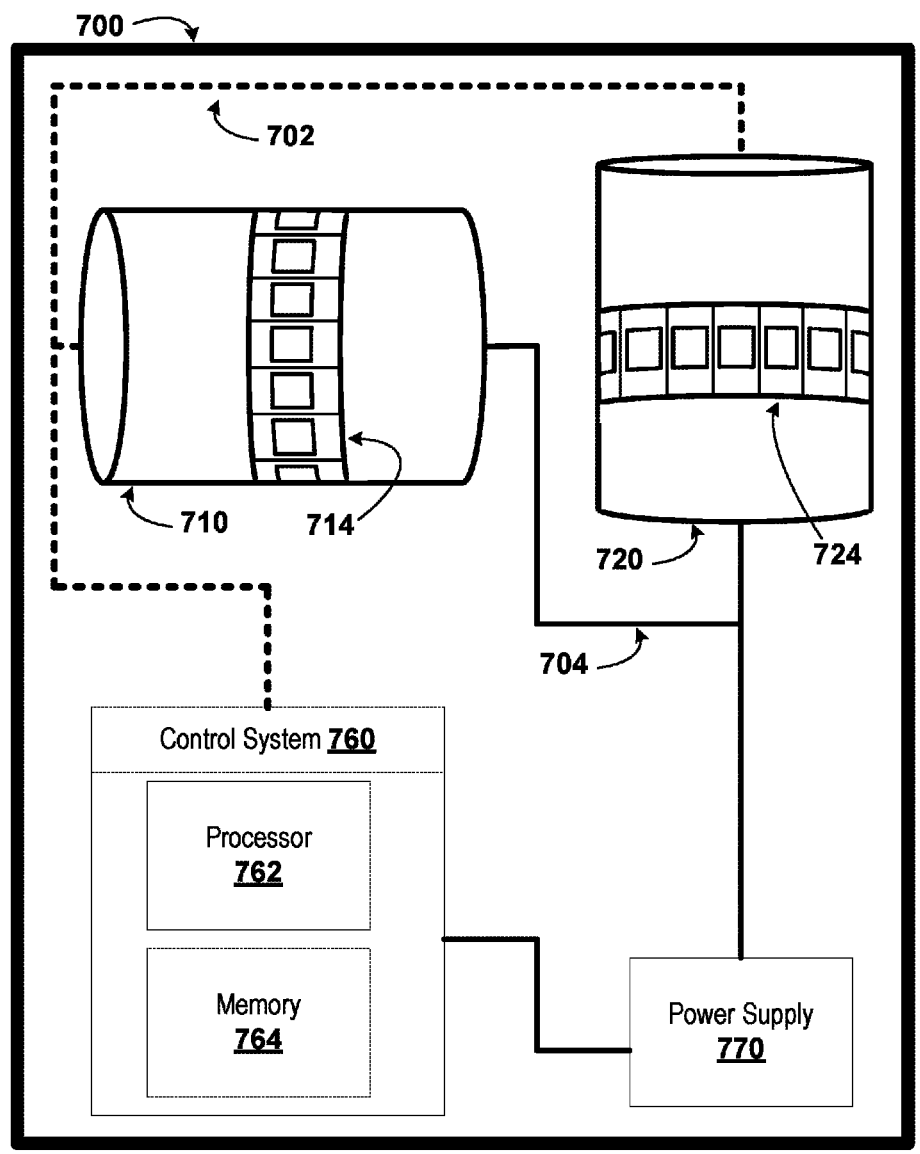
FIG. 7 is a block diagram of a horizontal and vertical projector, according to example embodiments.

In addition, if the two emitter configurations presented in FIGS. 6a and 6b were two separate emitters, they could simultaneously scan orthogonal angular ranges. Further, the two separate emitters could be placed on a single circuit board to scan an environment, as illustrated in FIG. 7.

As discussed above, in some embodiments of a light emitter (e.g., the light emitter 700 illustrated in FIG. 7), there may be a first curved array of individually addressable light-emitting elements 714 disposed behind a first cylindrical lens 710 on the same circuit board as a second curved array of individually addressable light-emitting elements 724 disposed behind a second cylindrical lens 720. The first and second curved arrays could be oriented such that the curved arrays emit respective patterns of illumination in first and second directions, respectively, such that the first and second directions are rotated relative to each other (e.g., such that the first and second directions are substantially orthogonal, that is, such that the first and second directions differ by between 80 degrees and 100 degrees). This could allow a light detector to determine the angle of the object relative to the light emitter in two orthogonal directions. In another example, the two curved arrays of the light emitter could be located at different locations in the environment, and determining the location of the object based on the illumination received by the object from the two arrays could include determining that the object is located on a particular plane or line within the environment based on the detected illumination and also based on the relative locations and orientations of the two curved arrays within the environment. Furthermore, in other embodiments, three or more curved arrays of individually addressable light-emitting elements with three or more curved optical elements could be employed across one or more light emitters.

Illumination received by an object (e.g., by a light detector of the object) from two (or more) different arrays and/or light emitters could be detected in a variety of ways. In an example embodiment, the different arrays could emit patterns of illumination during different respective periods of time. In such an example, detecting the illumination from the two different arrays could include operating a light detector of the object to detect light received by the object during the different respective periods of time. In another example, the different arrays could emit illumination at different respective wavelengths and detecting the illumination from the two different arrays could include operating multiple light detectors (e.g., light detectors coupled to respective wavelength-selective filters corresponding to the different wavelengths of the light emitted by the light emitters) of the object to detect light incident on the object at the different respective wavelengths. In yet another example, the illumination emitted from each of the arrays could be modulated at a different respective frequency, and detecting the illumination from the two different light emitters could include filtering a light intensity signal detected using a light detector of the object at the different respective frequencies. Additional or alternative methods of detecting the intensity over time of light received by an object from two or more arrays as described herein are anticipated by the inventors.

Furthermore, the cylindrical lenses 710/720 and the corresponding curved arrays of individually addressable light-emitting elements 714/724 could be packaged onto a circuit board 700. The circuit board 700 may include communication interconnects 702 for transmitting modulation signals to the individually addressable light-emitting elements 714/724 from a control system 760 (e.g., a control system 760 that includes a processor 762 configured to execute instructions stored on a memory 764 to generate illumination patterns to scan an environment). The circuit board 700 may also include power interconnects 702 that provide a supply voltage to the individually addressable light-emitting elements 714/724 from a power supply 770. The power supply 770 may include batteries or ultra-capacitors, in some embodiments. In alternate embodiments, the power supply 770 may include a plug configured to connect to a wall socket and an alternating current to direct current (AC to DC) converter.

III. Example Methods

Figure 8:
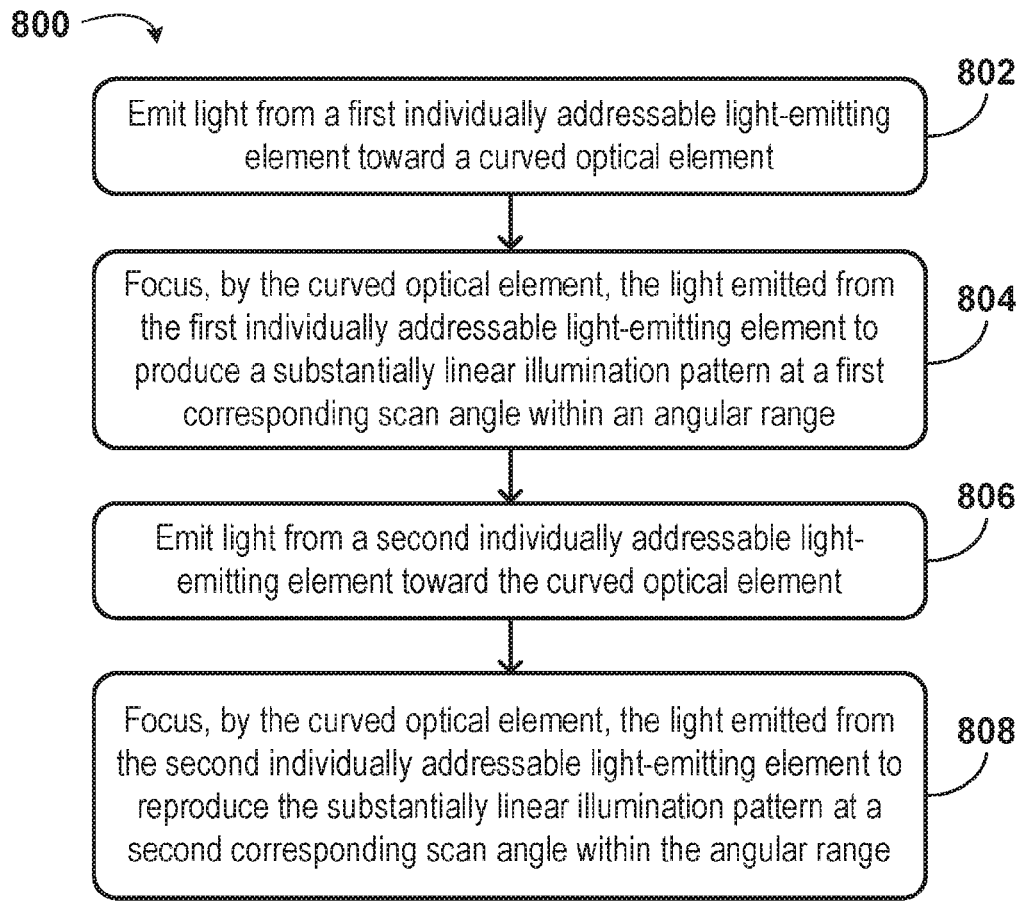
FIG. 8 is a flowchart of a method, according to example embodiments.

FIG. 8 is a flowchart of a method 800 for operating a light emitter to produce patterns of illumination as described elsewhere herein. Such patterns of illumination can be provided, during respective periods of time, to facilitate determining the location of objects, in a first direction relative to the light emitter, based on illumination received by the objects over time from the light emitter. The patterns of illumination are specified to spatially encode the environment of the light emitter such that different regions of the environment (e.g., different ranges of angles in the first direction, relative to the light emitter) receive different time-varying patterns of illumination from the light emitter. Such a time-varying pattern can be detected and used to determine which of the regions of the environment the time-varying pattern was detected from, and thus to determine the location (e.g., the angle in the first direction) of a light detector or other apparatus used to detect the time-varying pattern with respect to the light emitter.

The light emitter includes a number of sets of one or more interconnected individually addressable light-emitting elements that are disposed in an array of the light emitter and that each correspond to a respective one of the patterns of illumination emitted from the light emitter. The array is disposed relative to a curved optical element of the light emitter such that, when a particular set of one or more interconnected individually addressable light-emitting elements of the array is operated to emit light, the emitted light is focused by the curved optical element to produce a corresponding one of the patterns of illumination from the light emitter.

At block 802, the method 800 includes emitting light from a first individually addressable light-emitting element toward a curved optical element. Block 802 could include providing a voltage difference across the first individually addressable light-emitting element, in some embodiments. Further, the light emitted from the first individually addressable light-emitting element could be at a corresponding intensity and/or a corresponding wavelength determined by a control system, for example. The corresponding intensity and/or the corresponding wavelength could be based on a location within an environment to which the emitted light will be directed (e.g., the emitted light directed toward the center of an angular range of the environment could have a greater intensity than emitted light directed toward the edges of the angular range).

At block 804, the method 800 includes focusing, by the curved optical element, the light emitted from the first individually addressable light-emitting element to produce a substantially linear illumination pattern at a first corresponding scan angle within an angular range. Block 804 may include focusing the light emitted by the first individually addressable light-emitting element in one direction (e.g., horizontally) and spreading the light in an orthogonal direction (e.g., vertically). In order to accomplish this, the curved optical element could be a cylindrical lens, in some embodiments.

The substantially linear illumination pattern may extend in one dimension (e.g., vertically) across a dimension of the environment (e.g., a wall within a room). The width of the first corresponding scan angle within the angular range may correlate to the width of a projecting surface on the first individually addressable light-emitting element. Alternatively, the width of the first corresponding scan angle within the angular range may correlate to physical characteristics of the light emitted by the first individually addressable light-emitting element (e.g., beam waist of a laser beam or diffraction limit of the wavelength emitted by the first individually addressable light-emitting element).

At block 806, the method 800 includes emitting light from a second individually addressable light-emitting element toward the curved optical element. Similar to block 802, the light emitted from the second individually addressable light-emitting element could be at a corresponding intensity and/or a corresponding wavelength. The corresponding intensity and/or corresponding wavelength may correlate to a given location within the environment toward which the light emitted by the second individually addressable light-emitting element will be projected.

In some embodiments, the second individually addressable light-emitting element could be disposed immediately adjacent to the first individually addressable light-emitting element, within an array, for example. Furthermore, the first and the second individually addressable light-emitting elements could both be located on a circuit board. The first and the second individually addressable light-emitting elements could further be staggered with respect to one another such that a first projecting surface on the first individually addressable light-emitting element and a second projecting surface on the second individually addressable light-emitting element are aligned with one another. Additionally or alternatively, the first and the second individually addressable light-emitting elements could be located at different concentric positions about the curved optical element (e.g., both the first and the second individually addressable light-emitting elements could be the same distance from the curved optical element, but disposed at different angular locations around the curved optical element).

At block 808, the method 800 includes focusing, by the curved optical element, the light emitted from the second individually addressable, light-emitting element to reproduce the substantially linear illumination pattern at a second corresponding scan angle within an angular range. Similar to block 804, focusing could include focusing the light in one direction (e.g., horizontally), and spreading the light in an orthogonal direction (e.g., vertically). The reproduced substantially linear illumination pattern could be projected on a portion of the environment that lies immediately adjacent to the substantially linear illumination pattern projected by block 804, for example. This may occur if the respective first and second projecting surfaces of the first and second individually addressable light-emitting elements are aligned.

The method 800 could include further steps, wherein further patterns of illumination are generated, during respective periods of time, from the light emitter by generating light from respective further sets of one or more interconnected individually addressable light-emitting elements of the light emitter. Such further patterns of illumination could be provided to increase a resolution to which the location of a light detector or other object in the environment can be determined (e.g., by providing patterns of illumination that provide illumination selectively to smaller portions of the environment).

Further, the method 800 could include a step providing illumination, during a particular one or more periods of time, to all of the first range of angles (e.g., to provide synchronization or timing information to light detectors or other objects receiving such illumination). The method 800 could additionally include providing, via one or more provided patterns of illumination, optical transmissions of information to light detectors in the environment. Still further, the method 800 could include providing, via radio frequency transmissions, information about the timing, sequence, angles of an environment illuminated, or other information about patterns of illumination provided, during respective different periods of time, from the light emitter. The method 800 could include further steps, or steps alternative to those listed here.

Figure 9:
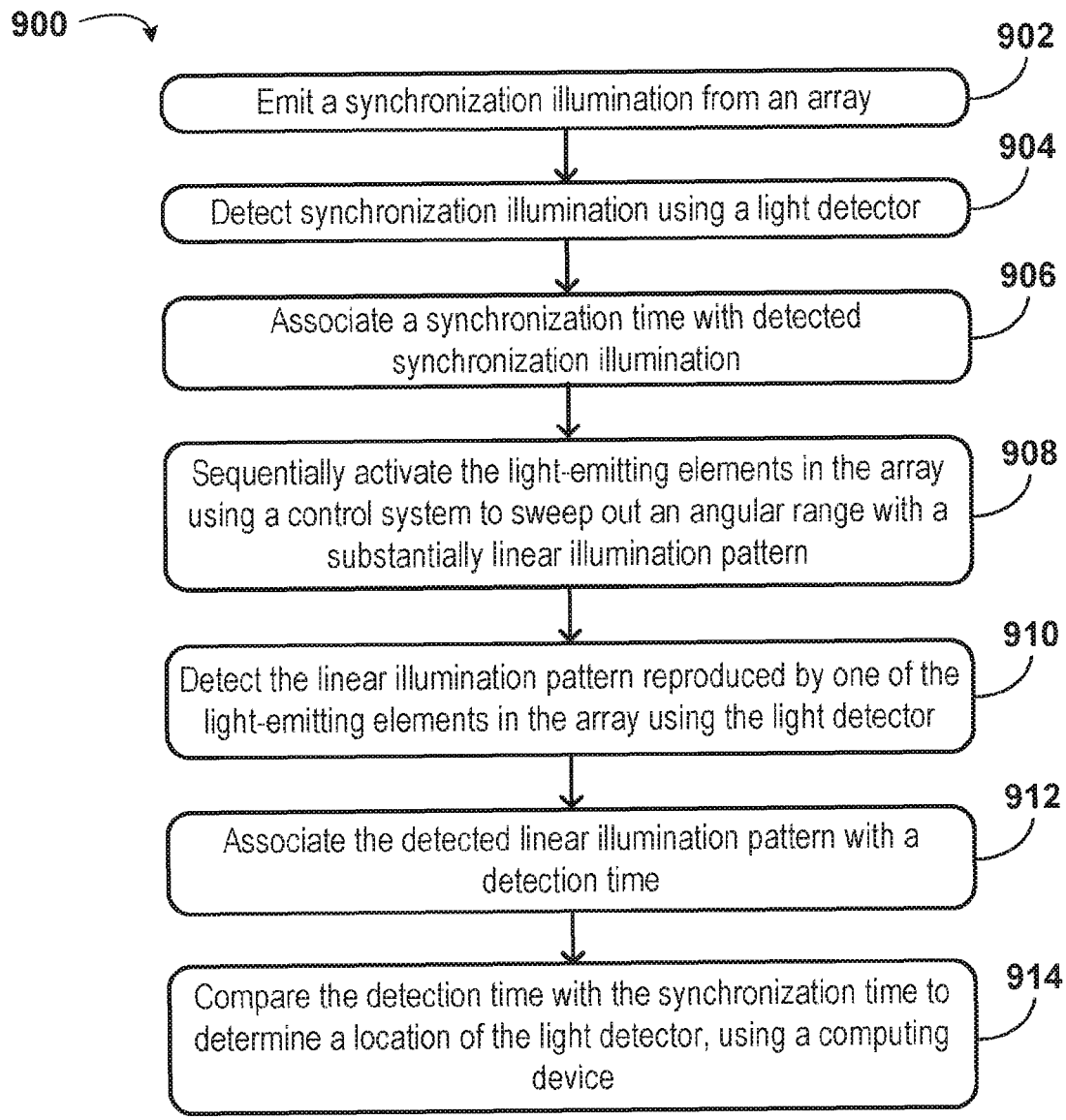
FIG. 9 is a flowchart of a method, according to example embodiments.

FIG. 9 is a flowchart of a method 900 for illuminating an environment by a light emitter and detecting an angular position within the environment where an object (e.g., a light detector) is located. The light emitter and the object could comprise a location detection system. The patterns of illumination may be specified to spatially encode the environment of the light emitter such that different regions of the environment (e.g., different ranges of angles in the first direction, relative to the light emitter) receive different time-varying patterns of illumination from the light emitter. Furthermore, the light emitter and the object could communicate with each other in additional ways beyond the illumination and detection of illumination patterns within the environment.

The light emitter includes a number of sets of one or more interconnected individually addressable light-emitting elements that are disposed in an array of the light emitter and that each correspond to a respective one of the substantially linear illumination patterns emitted from the light emitter. The array is disposed relative to a curved optical element of the light emitter such that, when a particular set of one or more interconnected individually addressable light-emitting elements of the array is operated to emit light, the emitted light interacts with the curved optical element to produce a corresponding one of the substantially linear illumination pattern from the light emitter.

At block 902, the method 900 includes emitting a synchronization illumination from an array. Block 902 may include illuminating a plurality of individually addressable light-emitting elements within the array (e.g., all of the individually addressable light-emitting elements within the array). Further, the plurality of individually addressable light-emitting elements within the array could emit light in a series of pulses, modulated at a corresponding synchronization frequency, intensity, and/or pattern. The corresponding synchronization frequency, intensity, and/or pattern could be recognizable by one or more light detectors, for example, as a way of determining that the illumination provided by the individually addressable light-emitting elements in the array in block 902 is a synchronization illumination.

At block 904, the method 900 includes detecting the synchronization illumination using a light detector. The light detector could be disposed at a particular angular position within an environment. As described above, the light detector could include a controller, such as a processor executing instructions stored within a memory, for example. Furthermore, the light detector could include a photodiode, a phototransistor, a photoresistive element, or some other component(s) configured to output a voltage, a current, or some other electrical signal related to the intensity, wavelength, or other properties of the received light. In some embodiments of method 900, block 904 could include detecting the synchronization illumination from a plurality of light detectors. For example, an object within the environment may have multiple light detectors positioned at different angular positions on the object (e.g., a light detector on the left arm and another light detector on the right arm of a person).

Further, detecting the synchronization illumination could include detecting a corresponding wavelength, intensity, and/or duration of illumination. Additionally, detecting the synchronization illumination could include detecting a wavelength and/or intensity profile with respect to time. Detecting such a profile could allow the light detector to more precisely pinpoint the angular position of the light detector within the environment.

At block 906, the method 900 includes associating a synchronization time with the detected synchronization illumination. Block 906 could include a transceiver associated with the light detector accessing a network (e.g., the public Internet) to determine the current time. Alternatively, the light detector could have an internal clock that stores the current time. Block 906 may also include storing the associated synchronization time in a memory. The memory could be located on-board the light detector, in some embodiments. Alternatively, the memory could be located remotely (e.g., a cloud storage device to which the light detector communicates the synchronization time).

At block 908, the method 900 includes sequentially illuminating the individually addressable light-emitting elements in the array using a control system to sweep out an angular range with a substantially linear illumination pattern. In some embodiments, block 908 may include illuminating different individually addressable light-emitting elements for different amounts of time. For example, the first individually addressable light-emitting element in the array could be activated for 500 milliseconds, and each successive individually addressable light-emitting element could be activated for 5 fewer milliseconds, consecutively. Such an illumination scheme could allow one or more light detectors to detect their respective angular positions relative to the light emitter. In addition to a modulation in time, a modulation in wavelength (e.g., each of the individually addressable light-emitting elements emits a slightly different wavelength of light) could be used during the sequential illumination of the individually addressable light-emitting elements in the array.

At block 910, the method 900 includes detecting the substantially linear illumination pattern reproduced by one of the light-emitting elements in the array using the light detector. Similarly to block 904, detecting the substantially linear illumination pattern could include detecting a corresponding wavelength, intensity, and/or duration of illumination. Further, detecting the substantially linear illumination pattern could include detecting a wavelength and/or intensity profile with respect to time. Detecting such a profile could allow the light detector to more precisely pinpoint the angular position of the light detector within the environment.

At block 912, the method 900 includes associating the detected substantially linear illumination pattern with a detection time. If a wavelength and/or intensity profile were detected with respect to time, block 912 could include associating the substantially linear illumination pattern with a set of detection times. Analogously to block 906, block 908 could include a transceiver associated with the light detector accessing a network (e.g., the public Internet) to determine the current time. Alternatively, the light detector could have an internal clock that stores the current time. Block 908 may also include storing the associated detection time in a memory. The memory could be located on-board the light detector, in some embodiments. Alternatively, the memory could be located remotely (e.g., a cloud storage device to which the light detector communicates the synchronization time).

At block 914, the method 900 includes comparing the detection time with the synchronization time to determine the angular position of the light detector, using a computing device. The computing device could be located on-board the light detector, in some embodiments. In alternate embodiments, the computing device could be a central server, for example, that determines the angular positions of multiple light detectors based on multiple respective detection times and synchronization times. The computing device, in such embodiments, may communicate with the light detector through a transceiver on the light detector, for example. Block 914 may include the computing device subtracting the synchronization time from the detection time to determine a time duration between when the synchronization illumination was detected and when the substantially linear illumination pattern was detected. Further, block 914 may include the computing device dividing the time duration between the synchronization illumination detection and the substantially linear illumination pattern detection by an illumination time of each of the individually addressable light-emitting elements in the emitter to determine the angular position of the light detector. The illumination time of each of the individually addressable light-emitting elements may have previously been transmitted from the light emitter to the light detector. Additionally or alternatively, the illumination time may have been generated/altered based on information contained within the synchronization illumination (e.g., the wavelength of the synchronization illumination serves as an indication from the light emitter to the light detector as to the illumination time of each of the individually addressable light-emitting elements that is used in the corresponding illumination sequence).

The method 900 could include further steps, wherein further patterns of illumination are generated, during respective periods of time, from the light emitter by generating light from respective further sets of one or more interconnected individually addressable light-emitting elements of the light emitter. Such further patterns of illumination could be provided to increase a resolution to which the angular position of a light detector or other object in the environment can be determined (e.g., by providing patterns of illumination that provide illumination selectively to smaller portions of the environment).

The method 900 could additionally include providing, via one or more provided patterns of illumination, optical transmissions of information to light detectors in the environment. Still further, the method 900 could include providing, via radio frequency transmissions, information about the timing, sequence, angles of an environment illuminated, or other information about patterns of illumination provided, during respective different periods of time, from the light emitter. The method 900 could include further steps, or steps alternative to those listed here.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A device comprising:
   a curved optical element;
   a curved array of individually addressable light emitters arranged to emit light towards the curved optical element, wherein a curvature of the curved array is substantially concentric to at least a portion of the circumference of the curved optical element, wherein the curved optical element is arranged to focus light emitted from each individually addressable light emitter to produce a substantially linear illumination pattern at a different corresponding scan angle within an angular range;

a controller operable to sequentially activate the individually addressable light emitters such that the substantially linear illumination pattern sweeps out the angular range;

a light detector configured to detect the substantially linear illumination pattern; and a computer configured to determine an angular position of the light detector based upon the pattern sweep.

2. The device of claim 1, wherein the substantially linear illumination pattern sweeping out the angular range is used to scan a physical space horizontally.

3. The device of claim 1, wherein the substantially linear illumination pattern sweeping out the angular range is used to scan a physical space vertically.

4. The device of claim 1, wherein the curved array is fabricated on a curved printed circuit board.

5. The device of claim 1, wherein the curved array contains thirty-two individually addressable light emitters.

6. The device of claim 1, wherein the number of individually addressable light emitters in the curved array contributes to an angular resolution of the angular range.

7. The device of claim 1, wherein the number of individually addressable light emitters in the curved array contributes to the size of the angular range.

8. The device of claim 1, wherein the width of the substantially linear illumination pattern focused from one of the individually addressable light emitters is such that the substantially linear illumination pattern would at least partially overlap the substantially linear illumination pattern focused from an adjacent individually addressable light emitter.

9. The device of claim 1, wherein the angular range is ninety degrees, one hundred and thirty-five degrees, or one hundred and eighty degrees.

10. The device of claim 1, wherein the curved optical element is a cylindrical lens.

11. The device of claim 1, wherein all of the individually addressable light emitters in the curved array are disposed at a constant distance from the curved optical element.

12. The device of claim 1, wherein the individually addressable light emitters are staggered with respect to one another in the curved array such that the substantially linear illumination pattern sweeps out the angular range contiguously.

13. A method comprising:

emitting light from a first individually addressable light emitter toward a curved optical element;

focusing, by the curved optical element, the light emitted from the first individually addressable light emitter to produce a substantially linear illumination pattern at a first corresponding scan angle within an angular range;

emitting light from a second individually addressable light emitter toward the curved optical element;

focusing, by the curved optical element, the light emitted from the second individually addressable light emitter to reproduce the substantially linear illumination pattern at a second corresponding scan angle within the angular range, wherein the first and second individually addressable light emitters are in a curved array of individually addressable light emitters, wherein a curvature of the curved array is substantially concentric to at least a portion of the circumference of the curved optical element, and wherein the first and second individually addressable light emitters are sequentially activated by a controller such that the substantially linear illumination pattern sweeps out at least a portion of the angular range;

detecting, by a light detector, the light emitted from the first individually addressable light emitter; and determining, by a computer, an angular position of the light detector based upon the pattern sweep.

14. The method of claim 13, wherein determining the angular position of the light detector comprises associating the detected light emitted from the first individually addressable light emitter with a detection time.

15. The method of claim 14, further comprising:

emitting, simultaneously, light from both the first and the second individually addressable light emitters to generate a synchronization illumination;

focusing, by the curved optical element, the light emitted from both the first and the second individually addressable light emitters;

detecting, by the light detector, the synchronization illumination;

associating the detected synchronization illumination with a synchronization time; and comparing, by a computing device, the detection time with the synchronization time to determine an angular position of the light detector.

16. The method of claim 13, further comprising:

emitting, simultaneously, light from both the first and the second individually addressable light emitters to generate a synchronization illumination; and focusing, by the curved optical element, the light emitted from both the first and the second individually addressable light emitters.

17. The method of claim 13, further comprising modulating, by the controller, a time interval between emitting light from the first individually addressable light emitter and emitting light from the second individually addressable light emitter.

18. The method of claim 13, wherein the light emitted from the first individually addressable light emitter and the light emitted from the second individually addressable light emitter are of different wavelengths.

19. The method of claim 13, wherein the first and the second individually addressable light emitters are light emitting diodes (LEDs).

20. A system comprising:

a light-emitting device, wherein the light-emitting device comprises:

a curved optical element;

a curved array of individually addressable light emitters arranged to emit light towards the curved optical element, wherein a curvature of the curved array is substantially concentric to at least a portion of the circumference of the curved optical element, wherein the curved optical element is arranged to focus light emitted from each individually addressable light emitter to produce a substantially linear illumination pattern at a different corresponding scan angle within an angular range; and a controller operable to sequentially activate the individually addressable light emitters such that the substantially linear illumination pattern sweeps out the angular range;

a light detector configured to detect the substantially linear illumination pattern; and a computer configured to determine an angular position of the light detector based upon the pattern sweep.

* * * * *